(12) United States Patent
Cerveny

(10) Patent No.: US 8,118,137 B2
(45) Date of Patent: Feb. 21, 2012

(54) MULTIPLE DUTY PORTABLE PNEUMATIC LUBRICATION DEVICE

(76) Inventor: William Cerveny, Glendale, AZ (US)

( * ) Notice: Subject to any disclaimer, the term of this patent is extended or adjusted under 35 U.S.C. 154(b) by 692 days.

(21) Appl. No.: 12/234,638

(22) Filed: Sep. 20, 2008

(65) Prior Publication Data

US 2010/0071998 A1    Mar. 25, 2010

(51) Int. Cl.
*F16N 13/16* (2006.01)
*F16N 13/00* (2006.01)
*F16N 13/06* (2006.01)

(52) U.S. Cl. .......... 184/29; 222/113; 222/323; 222/325; 184/105.2

(58) Field of Classification Search ............ 184/29, 184/105.2; 222/112, 323, 325
See application file for complete search history.

(56) References Cited

U.S. PATENT DOCUMENTS

| | | | | |
|---|---|---|---|---|
| 3,987,869 | A * | 10/1976 | Bowers | 184/105.1 |
| 4,719,991 | A * | 1/1988 | Diehn et al. | 184/6.28 |
| 5,044,471 | A * | 9/1991 | Machek | 184/105.2 |
| 5,404,967 | A * | 4/1995 | Barry | 184/105.2 |
| 5,460,656 | A * | 10/1995 | Waelput et al. | 134/10 |
| 5,535,849 | A * | 7/1996 | Few | 184/1.5 |
| 6,003,635 | A * | 12/1999 | Bantz et al. | 184/1.5 |
| 6,923,348 | B2 * | 8/2005 | Grach et al. | 222/262 |
| 2005/0258005 | A1* | 11/2005 | Chen | 184/105.2 |
| 2006/0060426 | A1* | 3/2006 | Chen | 184/105.2 |
| 2006/0108180 | A1* | 5/2006 | Grach et al. | 184/105.2 |

* cited by examiner

*Primary Examiner* — Michael Mansen
*Assistant Examiner* — Robert Reese
(74) *Attorney, Agent, or Firm* — Michael Ries

(57) ABSTRACT

A portable multiple duty grease gun is permanently housed and operated out of a portable housing. Two grease tubes feeding through a common funnel to a retractable hose with a hand held grease gun on the end. A pressure regulator, a compressor or mechanical pump with an electric motor, a rechargeable battery pack, and a control panel in the housing operate the system.

9 Claims, 4 Drawing Sheets

MULTIPLE DUTY PORTABLE PNEUMATIC LUBRICATION DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to lubrication devices or grease guns and particularly to a multiple duty portable pneumatic lubrication device or grease gun which comprises a portable housing having a carrying handle, which housing closes for transporting and opens for use to access a retractable hose having a hand held grease gun comprising a quick change coupler for installing a desired grease fitting on the outer end and a power and grease actuator lever spaced apart from the grease fitting by a length of hose, the hand held grease gun hose reeled out of the housing for use and automatically rewound into the housing for transportation or storage, a mechanical pump or compressor with an electric motor for pumping the grease, a pressure regulator, two or more replaceable or refillable grease cartridges or tubes which are dispensed using a common grease funnel connected to the grease hose wound about a retractable grease hose reel.

2. Description of Related Art Including Information Disclosed Under 37 CFR 1.97 and 1.98

Hand-held battery operated grease guns are useful in many situations, especially for those who are not working in a shop, such as traveling vehicle maintenance personnel, farmers, or vehicle owners who wish to lubricate their own vehicles. The portable grease guns available in the market are supplied with a single replaceable and disposable cartridge. A spring biased plunger discharges the grease from the cartridge into an area where a manually operated mechanism will force the grease through a discharge nozzle.

U.S. Pat. No. 3,987,869, issued Oct. 26, 1976 to Bowers, provides a lubrication system including a base with shoulder straps. A motor pressurizes grease received from cylinders having spring urged pistons. The pressurized grease is discharged by a grease gun at the end of a grease hose with a grease gun mounted switch controlling motor operation. The grease cylinders are removably mounted on the base by brackets and straps.

U.S. Patent Application #20060060426, published Mar. 23, 2006 by Chen, claims a lubricant gun which includes a housing, a lubricant reservoir, a plunger, and an exhaust valve. The housing includes a discharge spout, a slide channel fluidly communicated with the discharge spout, a lubricant supply passage having a lubricant supply hole fluidly connected to the slide channel, and a gas-discharging hole fluidly communicated with the slide channel. The lubricant reservoir is connected to the housing and is fluidly communicated with the slide channel through the lubricant supply passage and the lubricant supply hole. The plunger has a pushing portion received in the slide channel for sliding reciprocatingly therein. The exhaust valve is mounted on the housing and is fluidly communicated with the gas-discharging hole.

U.S. Patent Application #20050258005, published Nov. 24, 2005 by Chen, describes a lubricant gun which includes a housing, a lubricant reservoir, a motor, a final driver, an elongate eccentric seat, a guiding shroud, and a plunger. The elongate eccentric seat is mounted within the housing, and has a first portion connected eccentrically to the final driver, and a second portion opposite to the first portion. The guiding shroud is disposed between the elongate eccentric seat and a longitudinal slide channel within the housing, and defines a guide passage aligned longitudinally with the slide channel. The plunger has a guiding portion pivotally mounted to the second portion and slidably received in the guide passage, and a pushing portion received slidably in the slide channel. The guiding portion is guided by the guide passage when the plunger is driven by the elongate eccentric seat to reciprocate the guiding portion and the pushing portion of the plunger.

U.S. Patent Application #20060108180, published May 25, 2006 by Grach, discloses a device for dispensing a viscous fluid, such as a grease gun for dispensing lubricant. The grease gun delivers lubricant with a selectable variation in pressure and/or output. It includes a reservoir, a pump having a reciprocating plunger, an electric motor driving the pump, and a variable speed transmission for transmitting power from the motor to the pump. The transmission has at least two different output speed settings adapted to be selected for reciprocating the plunger at different cyclical frequencies. A cycle indicator provides an indication corresponding to a quantity of lubricant dispensed. Embodiments of the grease gun include a pressure relief valve which inhibits damage due to an over-pressure condition, and a circuit breaker which inhibits damage due to electrical overload.

U.S. Pat. No. 5,404,967, issued Apr. 11, 1995 to Barry, is for a grease gun extruding device used to provide grease to a fitting. A first and a second piston are reciprocated with respective passageways by an electric motor and act to press grease through the passageways into the fitting. The electric motor rotates a cam and the cam, in turn, moves a drive pin which is connected to the pistons through a piston block to provide the reciprocal motion. Single handed operation of the grease gun is possible after connecting it to the fitting.

U.S. Pat. No. 6,135,327, issued Oct. 24, 2000 to Post, provides a battery operated grease gun which includes a pump mechanism that employs a speed reducing and torque increasing planetary gearing transmission which rotates a final driver that is a part of the transmission, and a sliding yoke that is reciprocated by the final driver and is coupled to a plunger that dispenses the grease under pressure where the plunger is mounted to the yoke for relative movement therebetween.

U.S. Pat. No. 6,923,348, issued Aug. 2, 2005 to Grach, describes an industrial grease gun pump having a compressed-air-operated reciprocating motor for reciprocating a pump plunger through forward and return strokes. The pump has an outlet connected to a dispensing hose mounted on a reel for delivering fluid to a remote location.

What is needed is a portable multiple duty grease gun which bridges the gap between light and heavy duty grease guns.

BRIEF SUMMARY OF THE INVENTION

An object of the present invention is to house a hand held grease gun on a retractable hose fed by a pump from two grease tubes all housed and operated from a portable housing to provide a portable multiple duty grease gun which bridges the gap between light and heavy duty grease guns.

In brief, the present invention comprises a portable multiple duty grease gun which bridges the gap between light and heavy duty grease guns. The portable system is permanently housed and operated out of a tool box size housing having two grease tubes feeding through a common funnel to a retractable hose with a hand held grease gun on the end, a pressure regulator, a compressor with an electric motor, a rechargeable battery pack, and a control panel for operating the system.

The retractable grease hose is preferably 10-15' in length rolled around a reel which automatically retracts the hose after use.

A primary advantage of the present invention is that it provides a portable multiple duty grease gun which bridges the gap between light and heavy duty grease guns.

Another advantage of the present invention is that is it easy to use.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings.

DETAILED DESCRIPTION OF THE INVENTION

Figure 1:
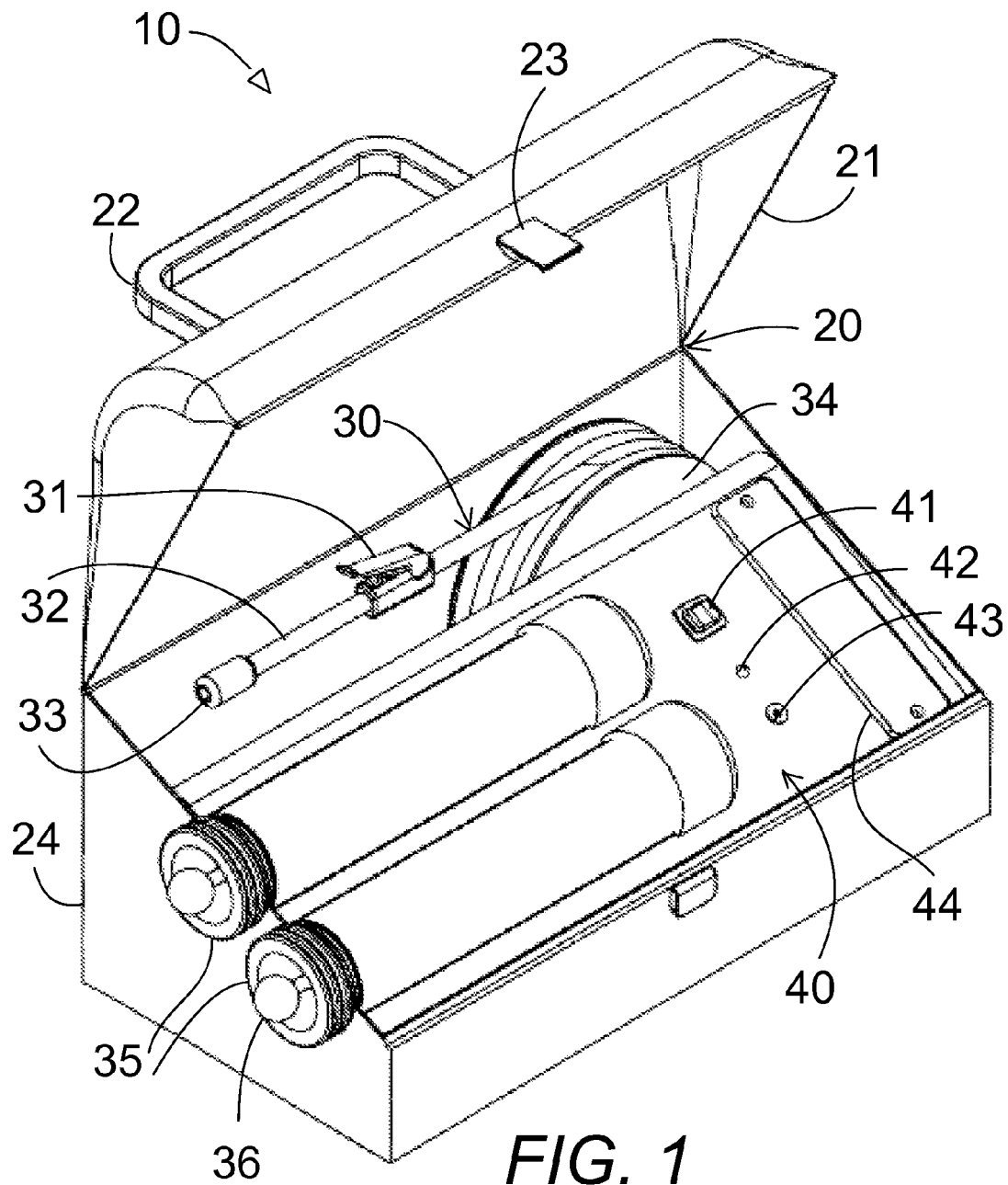
FIG. 1 is a perspective view of the portable pneumatic lubrication device of the present invention.
Figure 2:
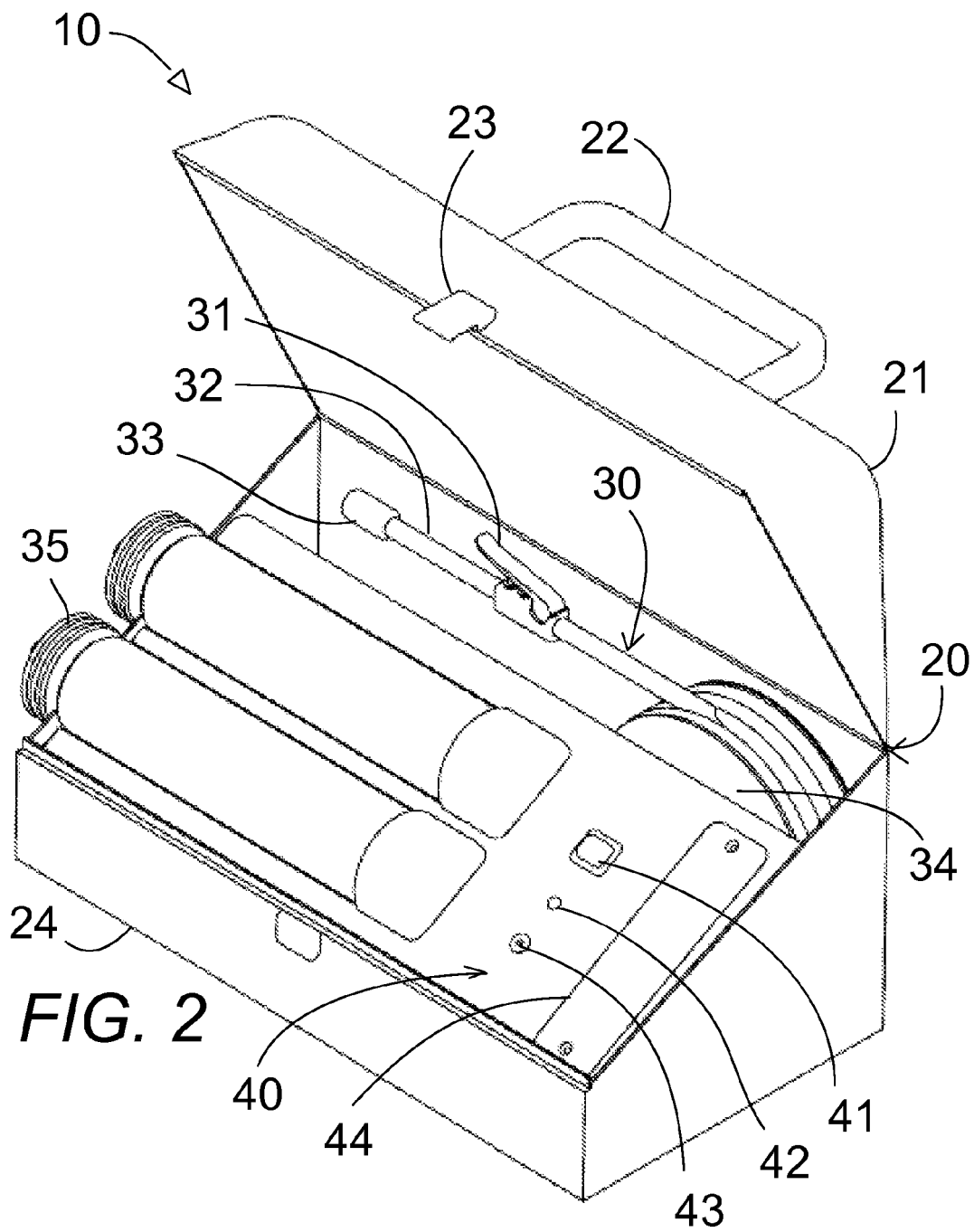
FIG. 2 is a perspective view of the portable pneumatic lubrication device of FIG. 1 showing the spring-loaded tube plungers in the grease tubes.

In FIGS. 1-4, a portable multiple duty pneumatic lubrication system 10 comprises a portable housing 20 containing all of the elements of the lubrication system operated from the housing for multiple duty lubrication uses ranging from light duty through medium duty to heavy duty lubrication applications.

The portable housing 20 comprises a base 24 containing components of the pneumatic lubrication system operated from the base, a hinged lid 21 pivoted into a first open position, as shown in FIGS. 1-4, to access the components and pivoted into a second closed position with a latch lock 23 for transporting and storing the portable housing, and a carrying handle 22 on the outside of the portable housing on the lid 21 for transporting the portable housing.

A hand held grease gun on an outer end of a retractable grease hose 32 comprises a quick change coupler for installing a desired grease fitting 33 on the outer end of the hose and a power and a grease actuator lever 31 spaced apart from the grease fitting by a length of hose 32, is stored on an automatically retractable reel 34 in the portable housing 20. The hand held grease gun hose 32 on the reel 34 is reeled out of the housing for use and automatically rewound into the housing for transportation and storage.

A means for pumping the grease through the hose to the grease gun comprises either an air compressor 50A or a mechanical pump 50B permanently contained and operated in the portable housing 20.

At least two grease tubes 35 are attached to a common grease funnel connected to the grease hose 32, each comprising a spring loaded grease tube plunger 36 to drive the grease into the pump, for pumping grease from the grease tubes into the grease hose and out of the hand held grease gun for lubrication use. The grease tubes may be removable and replaceable or refillable.

Figure 3:
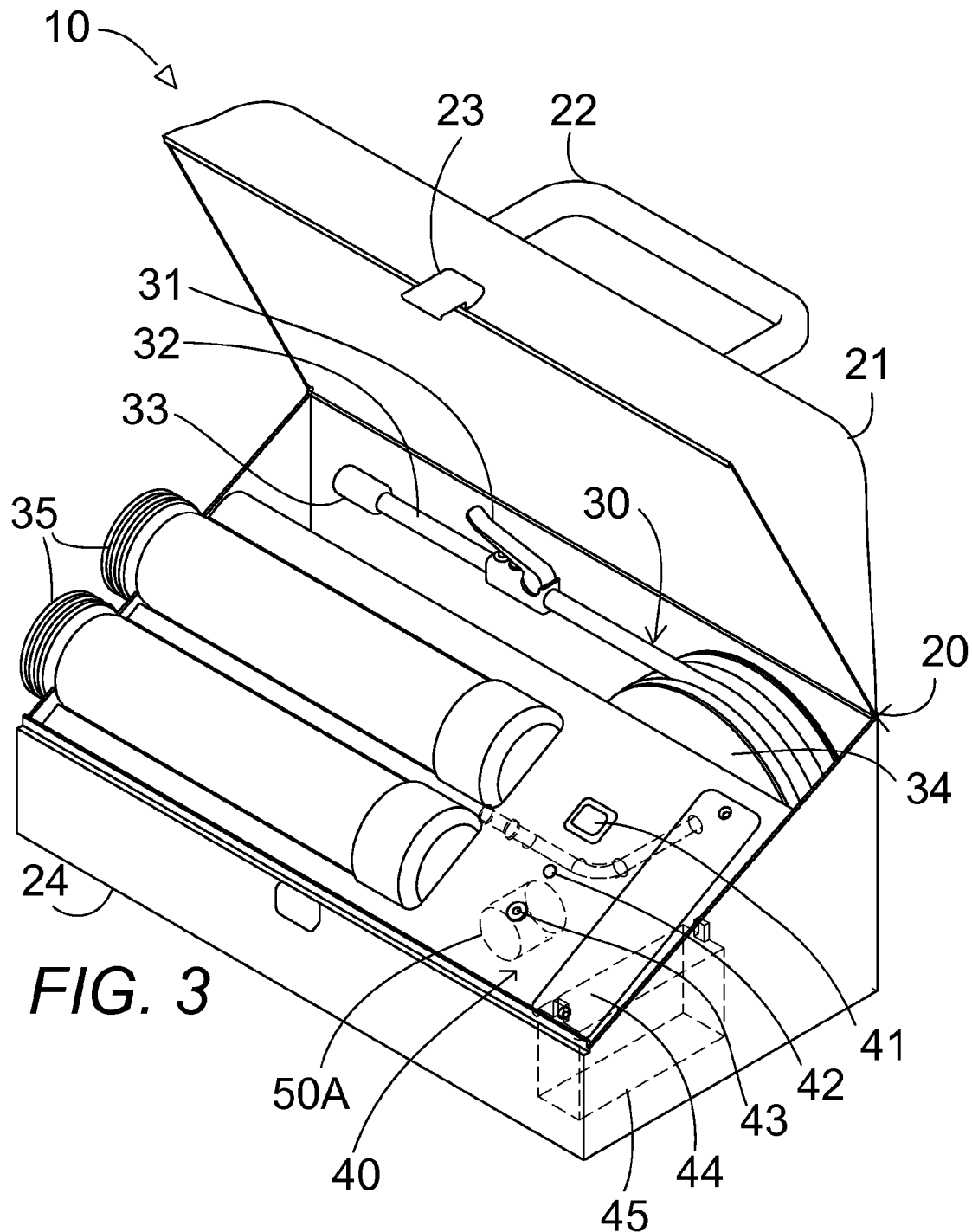
FIG. 3 is a perspective view of the portable pneumatic lubrication device of the present invention having a air compressor pump.

In FIG. 3, the air compressor 50A is powered by an electric motor powered by a battery 45 all housed and operated within the portable housing 20. The electric motor starts the compressor 50A which pressurizes a grease compartment communicating with the common funnel and pressure in the grease hose 32 drives the grease to the hand held grease gun 31 and 32, wherein depressing the grease actuator lever 31 starts the compressor 50A and opens a release value to allow grease to pass to the hand held grease gun. A pressure regulator housed and operated within the portable housing regulates the pressure applied by the compressor to the grease.

A control panel 40, housed and operated within the portable housing on a visible surface of the base 24, comprises a power switch 41 for the air compressor and the electric motor, a battery recharging plug receptacle 44, an LED light power and charge indicator 42 and a plug receptacle 43 for a battery charger plug.

Figure 4:
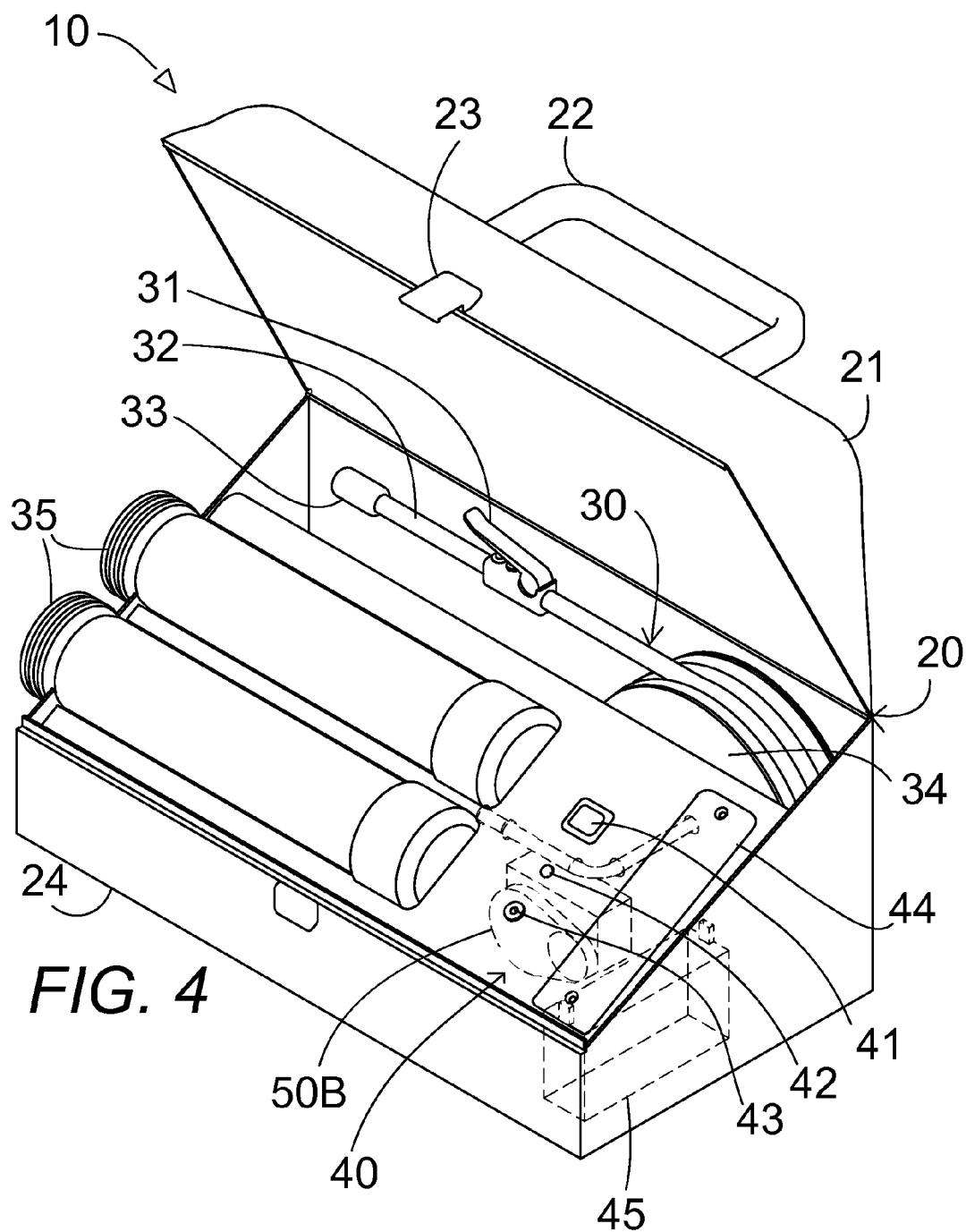
FIG. 4 is a perspective view of the portable pneumatic lubrication device of the present invention having a mechanical pump.

In FIG. 4, a mechanical pump 50B is housed and operated within the portable housing 20. The mechanical pump 50B comprises an electric motor moving a pump cylinder up and down to create a vacuum and pressure to drive grease to the hand held grease gun 31 and 33 and depressing the grease actuator lever 31 starts the electric motor and opens a release valve to allow the grease to be pumped to the hand held grease gun.

It is understood that the preceding description is given merely by way of illustration and not in limitation of the invention and that various modifications may be made thereto without departing from the spirit of the invention as claimed.

What is claimed is:

1. A portable pneumatic lubrication system, comprising:
a portable housing with an interior portion, a top portion and an exterior comprising a base containing components of the pneumatic lubrication system operated from the base, a hinged lid pivoted into a first open position to access the components and pivoted into a second closed position to transport and store the portable housing, a carrying handle disposed on the top portion of the portable housing to transport the portable housing;
a hand held grease gun disposed on an outer end of a retractable grease hose stored on an automatically retractable reel disposed within the interior portion of the portable housing, the grease gun comprising a quick change coupler to install a desired grease fitting on the outer end of the hose and a power and grease actuator lever spaced apart from the grease fitting by a length of hose, the hand held grease gun hose reeled out of the housing to use in multiple duty lubrication and automatically rewound into the housing to transport and store;
means for pumping the grease through the hose to the grease gun permanently contained in the portable housing; and
at least two grease tubes extending outward to the exterior of the portable housing attached to a common grease funnel connected to the grease hose, each comprising a spring loaded grease tube plunger to drive the grease into the means for pumping, to pump grease from the grease tubes into the grease hose and out of the hand held grease gun to lubricate in multiple duty lubrication from light duty through medium duty to heavy duty lubrication applications.

2. The system of claim 1, wherein the means for pumping the grease comprises an air compressor powered by an electric motor powered by a battery all housed and operated within the interior portion of the portable housing.

3. The system of claim 2, wherein the electric motor starts the compressor which pressurizes a grease compartment communicating with the common funnel and pressure in the grease hose drives the grease to the hand held grease gun, wherein depressing the grease actuator lever starts the compressor and opens a release value to allow grease to pass to the hand held grease gun.

4. The system of claim 2, further comprising a pressure regulator housed and operated within the portable housing to regulate the pressure applied by the compressor to the grease.

5. The system of claim 4, further comprising a control panel housed and operated within the portable housing, the control panel comprising a power switch to activate the air compressor and the electric motor, a battery recharging plug receptacle, an LED light power and charge indicator.

6. The system of claim 1, wherein the means for pumping the grease comprises a mechanical pump housed and operated within the interior portion of the portable housing.

7. The system of claim 6, wherein an electric motor moves a pump cylinder up and down to create a vacuum and pressure to drive grease to the hand held grease gun and depressing the grease actuator lever starts the electric motor and opens a release valve to allow the grease to be pumped to the hand held grease gun.

8. The system of claim 1, wherein the grease tubes are removable and replaceable.

9. The system of claim 1 wherein the grease tubes are refillable.

* * * * *